United States Patent [19]

Dighe

[11] Patent Number: 4,889,556
[45] Date of Patent: Dec. 26, 1989

[54] METHOD OF RECYCLING STEEL BELTED TIRES

[75] Inventor: Shyam V. Dighe, North Huntingdon, Pa.

[73] Assignee: Westinghouse Electric Corp., Pittsburgh, Pa.

[21] Appl. No.: 226,712

[22] Filed: Aug. 1, 1988

[51] Int. Cl.[4] .............................................. C22B 4/00
[52] U.S. Cl. .................................... 75/10.22; 75/58; 75/44 S
[58] Field of Search ................. 75/10.22, 10.12, 58, 75/44 S, 41, 42

[56] References Cited

U.S. PATENT DOCUMENTS

| | | | |
|---|---|---|---|
| 4,175,949 | 11/1979 | Breznay | 75/44 S |
| 4,455,165 | 6/1984 | Santen | 75/41 |
| 4,611,332 | 9/1986 | Santen | 75/10.22 |
| 4,753,676 | 6/1988 | Kodatsky | 75/58 |

Primary Examiner—Peter D. Rosenberg
Attorney, Agent, or Firm—Fred J. Baehr, Jr.

[57] ABSTRACT

A process for recycling steel belted tires by shredding the tires in multiple stages and separating the rubber from the rubber encrusted steel until the rubber encrusted steel is about 50% steel and charging a plasma fired cupola with the rubber encrusted steel, coke, and limestone, melting the steel and adding dolomite as a desulfurizing agent in the plasma torch feed nozzle to make a low sulfur iron.

14 Claims, 3 Drawing Sheets

METHOD OF RECYCLING STEEL BELTED TIRES

BACKGROUND OF THE INVENTION

This invention relates to a method of recycling rubber tires and more particularly to a method recycling steel belted tires.

Scrap tires are an environmental problem particularly steel belted tires as the steel belts reduce their value to rubber manufacturers as a large percentage of the tire consists of steel belts encrusted in rubber, making the salvage of the rubber more difficult and expensive as the steel belts make about 10% of the tire, by weight.

The iron and steel industries can not economically use the rubber encrusted steel belts as scrap because of the high sulfur content of the rubber as the sulfur ends up in the melted iron substantially reducing the value of the iron made from such scrap.

The object of this invention is to reduce the rubber encrusting the steel belts to a minimum, melting the steel belts in a cupola and reducing the sulfur content of the melted iron to sufficiently low levels to produce a commercially valuable low sulfur iron in an environmentally acceptable process.

SUMMARY OF THE INVENTION

In general, a method of recycling steel belted tires, when performed in accordance with this invention, comprises the steps of shredding the steel belted tires; separating the shredded rubber having steel disposed therein form shredded rubber free of steel; reshredding the rubber with steel disposed therein and separating the shredded rubber with steel disposed therein from shredded rubber free of steel until the shredded rubber with steel disposed therein is generally 50% or more steel;

placing the shredded rubber with generally 50% or more steel in a plasma fired cupola with coke and a fluxing agent; operating the plasma fired cupola to burn the rubber from the steel and melt the steel to form a molten pool of iron and slag within the lower portion of the plasma fired cupola;

adding a desulfurizing agent to the plasma fired cupola via a plasma torch feed nozzle;

operating the plasma torch at a power level sufficient to melt the desulfurizing agent in the plasma torch feed nozzle, the melted desulfurizing agent reacting with sulfur in the molten iron to remove the sulfur therefrom and the reacted and unreacted desulfurizing agent combining with the slag, reducing its viscosity and making it flow better.

The off gas may be burned and used to heat the blast air, to make steam in a boiler for operating a process or produce electricity. The off gas can also be cleaned and burned in a cement kiln or used in any endothermic process.

BRIEF DESCRIPTION OF THE DRAWINGS

The invention as set forth in the claims will become more apparent by reading the following detailed description in conjunction with the accompanying drawings, in which:

DESCRIPTION OF THE PREFERRED EMBODIMENT

Figure 1:
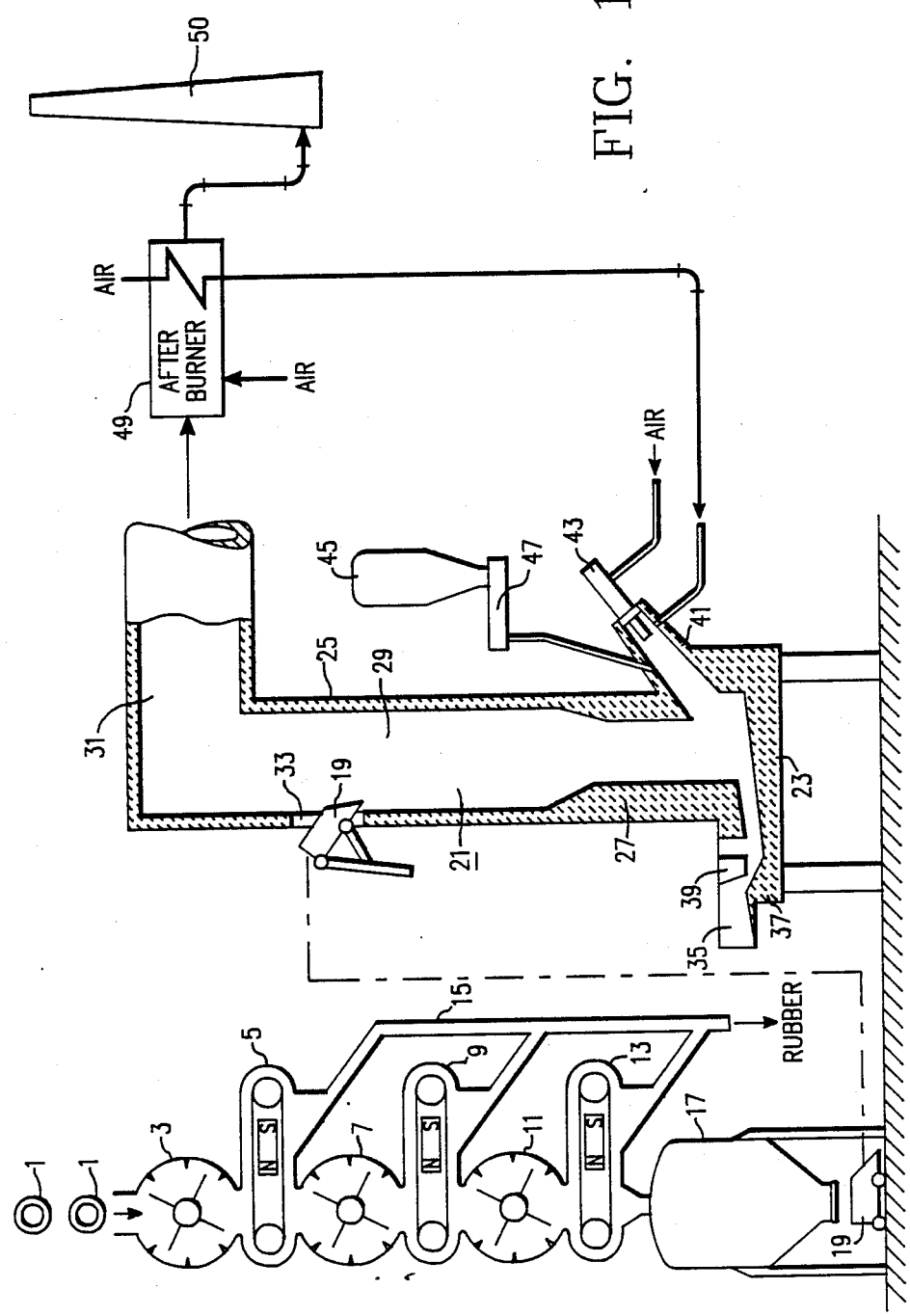
FIG. 1 is a schematic of a process for shredding steel belted tires, separating the rubber encrusted steel and feeding it into the plasma fired cupola to make iron.
Figure 2:
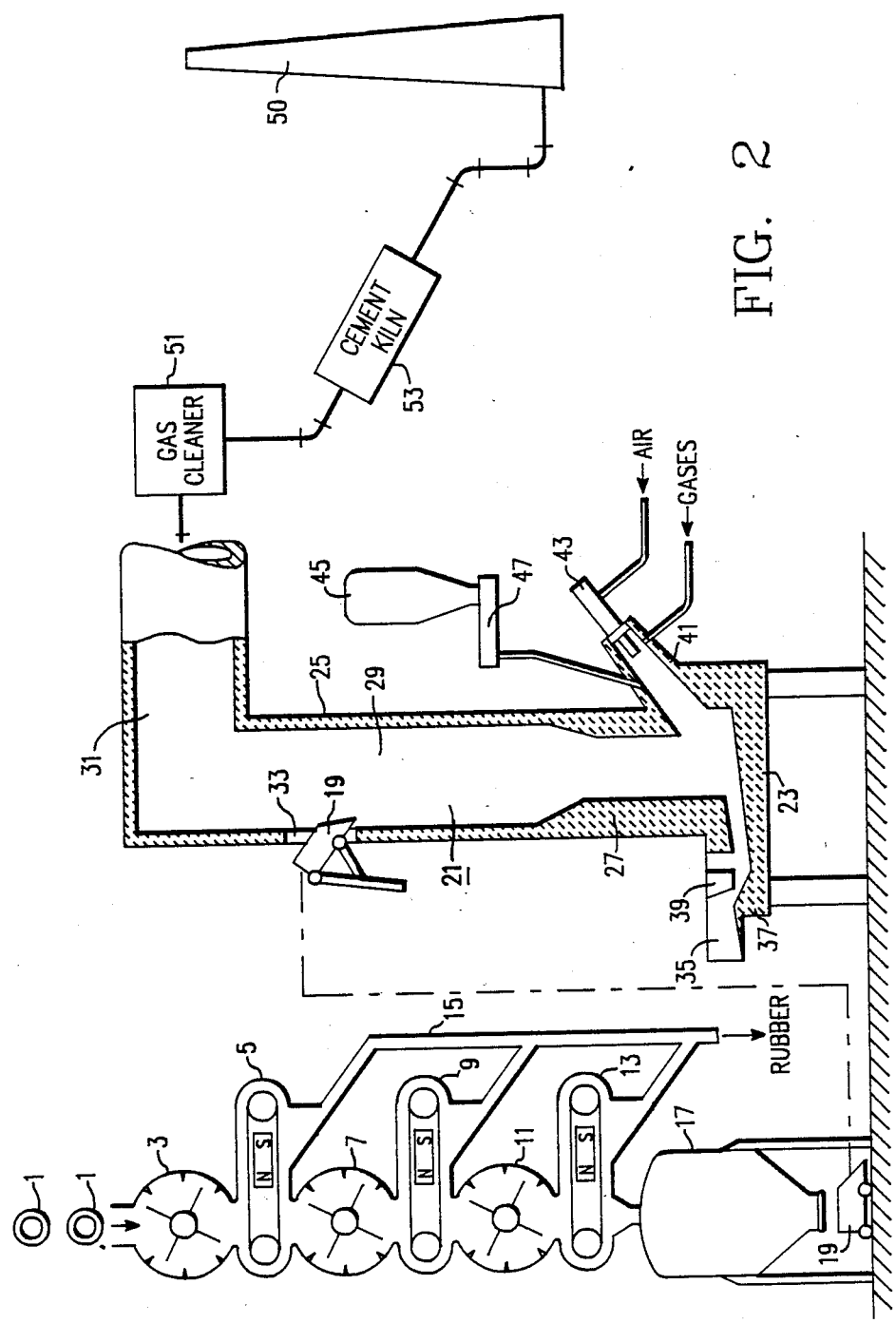
FIG. 2 is an alternative schematic, wherein the off gases from the plasma fired cupola are utilized in a cement kiln.
Figure 3:
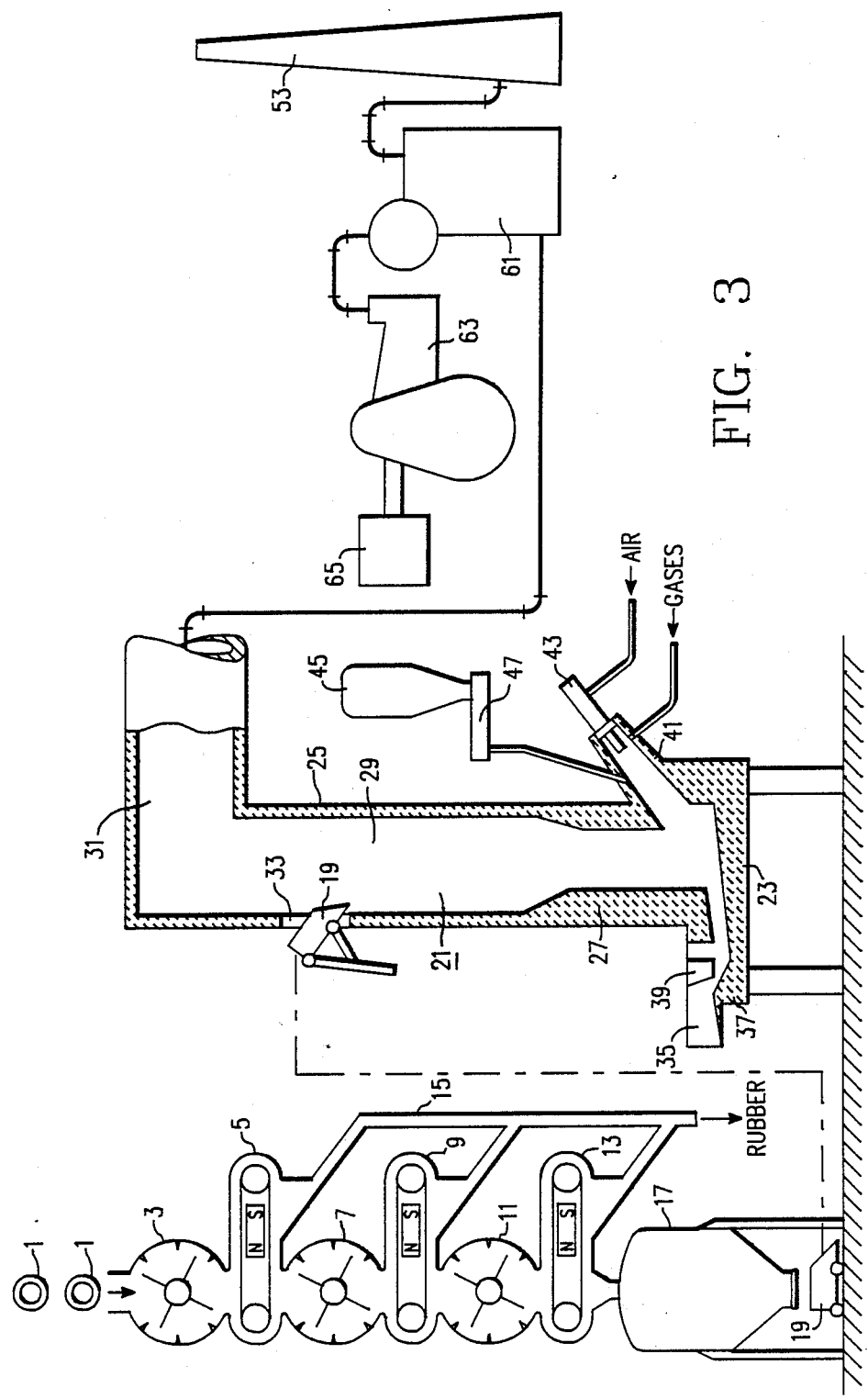
FIG. 3 is an alternative schematic, wherein the off gases from the plasma fired cupola are utilized in a boiler to make steam to operate a turbine generator.

Referring now to the drawings in detail and in particular to FIG. 1 there is shown a schematic of a process for making iron from steel belted tires 1. The tires 1 are fed into a first shredder 3, the shredded rubber and rubber encrusted steel drop into a first magnetic separator 5 wherein the rubber and rubber encrusted steel are magnetically separated, the separated rubber encrusted steel is then fed to a second shredder 7 and then to a second magnetic separator 9, the separated rubber encrusted steel is fed to a third or additional shredders 11 and third or additional magnetic separators 13. The rubber is fed through a conduit 15 to a hopper (not shown) where it is collected so that it can be sold to rubber manufacturers to be recycled into rubber products or to other users of shredded rubber. While only three stages of shredding and separation are shown if four stages are utilized about 80% of the tire is recoverable as rubber, the remaining 20% is steel encrusted rubber which is about 50% rubber and 50% steel. The rubber encrusted steel is fed into a hopper 17 and from the hopper 17 the rubber encrusted steel is fed into a container 19. The container 19 is utilized to transport the rubber encrusted steel to a plasma fired cupola 21.

The cupola 21, which is a furnace having a base or hearth portion 23 and a shaft portion which is vertical cylindrical housing 25 extending upwardly from the base 23. The base 23 and housing 25 may be lined with fire brick or other refractory material 27 and/or may have a water jacket (no shown) to cool the exterior portion thereof. The housing 25 forms a generally unobstructed round open shaft 29 with an exhaust gas conduit 31 connecting the upper end of the shaft 29 to a stack 50. A charge door comprising an opening 33 which is disposed adjacent the upper end of the shaft 29 for loading a charge into the plasma fired cupola 21.

A charge normally comprises coke, which is generally about 2% of the weight of the iron or about 40 lbs. per ton of iron; rubber encrusted steel, which makes up the bulk of the charge and a fluxing agent such as dolomite or limestone, which is generally about 0.6% of the weight of the iron or about 12 lbs. per ton of iron.

Disposed adjacent the base portion 23 is a spout 35 having a dam 37 and a skimmer 39, which cooperate to separate the molten iron and slag which are separately drawn from the spout 35.

A plasma torch feed nozzle 41 is disposed in the lower portion of the shaft 29 with one end opening into the shaft 29 and has a plasma torch 43 disposed in the end opposite the end opening into the shaft 29. While only one plasma torch feed nozzle 41 is shown it is understood that any number of plasma torch feed nozzles 41 may be incorporated in the plasma fired cupola 21 depending on the size and designed throughput. The plasma torch feed nozzle 41 is described in detail in an allowed patent application entitled "Plasma Fired Feed Nozzle" that is hereby incorporated herein by reference.

A particulate material bin 45 is disposed above the plasma torch feed nozzle 41 and has a screw auger 47 or other feed means cooperatively associated therewith to control the flow of particulate material to the plasma torch feed nozzle 41. The bin 25 contains an additional fluxing agent from the group of fluxing agents comprising CaO, MgO, $CaCO_3$, $MgCO_3$, and $CaCO_3MgCO_3$, which is fed to the plasma torch feed nozzle 41 by the screw auger 47 at the rate of approximately 20 pounds per hour per ton of iron melted.

Disposed in the exhaust gas conduit is an after burner 49 wherein the off gases are mixed with air and burned prior to being discharged through a stack 50. The heat thus generated can be utilized to preheat the blast air which is generally supplied at the rate of 13,500 scfm per ton of iron melted.

Since the off gases contain combustible gases and produce a considerable amount of energy when burned, they may be utilized in various endothermic applications that require a considerable heat input. The off gas can be cleaned in an electrostatic precipitator or other cleaning device 51 and burned in a cement kiln 53, or can be burned in a boiler 61 to make steam to operate a steam turbine 63, which is directly coupled to an electrical generator 65 to make electricity.

The operation of the process is as follows: tires 1 are shredded in multiple shredders 3, 7 and 11 and rubber encrusted steel is separated from the rubber by multiple magnetic separators 5, 9 and 13 after each shredding until the final separated rubber encrusted steel is generally 50% steel and 50% rubber. The rubber encrusted steel together with coke, and a fluxing agent such as limestone are placed in the cupola forming a charge. For every ton of steel melted the charge includes about 40 lbs. of coke and about 12 lbs. of limestone. The plasma torch or torches 43 operated at a power of about 250 kilowatts per hour per ton of iron or at a power level that produces equivalent blast at temperatures in the range of 2500° F. to 3500° F. A desulfurizing agent is fed from the particulate material bin 45 via the screw auger 47 into the plasma torch feed nozzle 41 at the rate of about 20 lbs per ton of steel or at a rate dependent on the sulfur content of the feed, wherein the desulfurizing agent is melted. The melted desulfurizing agent combines with the molten iron and slag removing sulfur from the iron to produce a commercially valuable iron. The percentages of coke, fluxing agent and desulfurizing agent may vary depending on the rubber to steel ratio, the percentage of sulfur in the feed and the type of iron being produced. The off gas is combustible and may be utilized in various processes requiring a heat input. A cement kiln and power generation are given as examples of some of the uses to which the off gases can be put to improve the economy of the overall process, however any endothermic process may be combined with the plasma fired cupola to improve economy of the process.

The forgoing describes a process for recycling steel belted tires which reduces the rubber encrusting the steel to a minimum and removes sulfur from the molten iron in the plasma fired cupola to a sufficiently low level so that the process is economically feasible and environmentally acceptable.

What is claimed is:

1. A method of recycling steel belted tires comprising the steps of:
   utilizing steel belted tires as the only source of iron;
   placing steel-belted tires containing rubber coated steel in a plasma fired cupola said cupola having hearth and shaft portions with coke and a fluxing agent;
   operating the plasma-fired cupola to burn the rubber and form a molten pool of iron and slag within the hearth portion of the cupola;
   adding a desulfurizing agent to the cupola via a plasma torch feed nozzle; and
   operating a plasma torch at a power level sufficient to melt the desulfurizing agent in the plasma torch feed nozzle, the melted desulfurizing agent reacting with sulfur in the molten iron and the reacted and unreacted desulfurizing agent combining with the slag, reducing its viscosity and making it flow better.

2. The method of claim 1 further comprising the step of shredding the steel belted tires.

3. The method of claim 2 further comprising the steps of separating shredded rubber with steel disposed therein from shredded rubber free of steel and placing the shredded rubber with steel disposed therein into the cupola.

4. The method of claim 3 further comprising the steps of reshredding the rubber with steel disposed therein and separating the rubber with steel from the steel free rubber until the shredded rubber with steel disposed therein is generally 50% or more steel and placing the shredded rubber with 50% or more steel in the cupola.

5. The method of claim 1 further comprising the step of:
   utilizing the exhaust gas from the cupola in an endothermic process.

6. A method of recycling steel belted tires comprising the steps of:
   placing steel-belted tires containing rubber coated steel in a plasma fired cupola with coke and a fluxing agent;
   operating the plasma-fired cupola to burn the rubber and form a molten pool of iron and slag within the hearth portion of the cupola;
   adding a desulfurizing agent to the cupola via a plasma torch feed nozzle;
   operating a plasma torch at a power level sufficient to melt the desulfurizing agent in the plasma torch feed nozzle, the melted desulfurizing agent reacting with sulfur in the molten iron and the reacted and unreacted desulfurizing agent combining with the slag, reducing its viscosity and making it flow better; and
   utilizing the exhaust gas from the cupola in an endothermic process.

7. The method of claim 1 and further comprising the steps of:
   burning the off gas from the cupola by adding air thereto; and
   preheating the blast air for the cupola utilizing the burned off gas.

8. The method of claim 5 and further comprising the steps of:
   burning the off gas from the cupola by adding air; and
   passing the burned off gas through a boiler to make steam.

9. The method of claim 8 and further comprising the step of:
   utilizing the steam to operate a steam turbine which is coupled to a generator to make electricity.

10. The method of claim 1 and further comprising the steps of:
    removing particulate material from the off gas; and burning the off gas in a cement kiln.

11. The method of claim 1 wherein the step of placing the shredded rubber with generally 50% or more steel in a plasma fired cupola with coke and a fluxing agent comprises adding about 40 lbs of coke per ton of steel and adding about 12 lbs of fluxing agent per ton of steel.

12. The method of claim 1 wherein the step of adding a desulfurizing agent to the cupola via a plasma torch feed nozzle comprises adding about 20 lbs of desulfurizing agent per ton of steel.

13. The method of claim 1 wherein the step of adding a desulfurizing agent to the cupola via a plasma torch feed nozzle comprises adding a desulfurizing agent from a group of desulfurizing including CaO, MgO, $CaCO_3$, $MgCO_3$, and $CaCO_3MgCO_3$.

14. The method of claim 1 wherein the step of operating a plasma torch at a power level sufficient to melt the desulfurizing agent in the plasma torch feed nozzle comprises operating the plasma torch at a power level of about 250 kilowatts hours per ton of steel melted.

* * * * *